United States Patent
Gerlach et al.

(10) Patent No.: US 10,841,795 B2
(45) Date of Patent: Nov. 17, 2020

(54) METHOD AND SYSTEM FOR PROTECTED COMMUNICATION BETWEEN A MOBILE UNIT COUPLED TO A SMARTPHONE AND A SERVER

(71) Applicant: VOLKSWAGEN AKTIENGESELLSCHAFT, Wolfsburg (DE)

(72) Inventors: Matthias Gerlach, Potsdam (DE); Michael Anteboth, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 211 days.

(21) Appl. No.: 16/063,384

(22) PCT Filed: Dec. 1, 2016

(86) PCT No.: PCT/EP2016/079437
§ 371 (c)(1),
(2) Date: Jun. 18, 2018

(87) PCT Pub. No.: WO2017/102355
PCT Pub. Date: Jun. 22, 2017

(65) Prior Publication Data
US 2018/0376334 A1    Dec. 27, 2018

(30) Foreign Application Priority Data
Dec. 17, 2015   (DE) .......................... 10 2015 225 792

(51) Int. Cl.
*H04L 29/00* (2006.01)
*H04W 12/06* (2009.01)
(Continued)

(52) U.S. Cl.
CPC ............ *H04W 12/06* (2013.01); *G06F 21/35* (2013.01); *H04L 63/0435* (2013.01);
(Continued)

(58) Field of Classification Search
CPC ... H04W 12/06; H04W 12/04; H04W 12/003; H04W 4/80; H04L 63/0435;
(Continued)

(56) References Cited

U.S. PATENT DOCUMENTS 8,656,179 B2 * 2/2014 Billings .................. G06F 21/78
380/44
9,009,805 B1 * 4/2015 Kirkby ............. G08B 13/19684
726/7
(Continued)

FOREIGN PATENT DOCUMENTS

DE    102013012339 A1    1/2015
EP       2433457 A2    3/2012
(Continued)

OTHER PUBLICATIONS

Search Report for German Patent Application No. 10 2015 225 792.4; dated Nov. 3, 2016.
(Continued)

*Primary Examiner* — Don G Zhao
(74) *Attorney, Agent, or Firm* — Barnes & Thornburg LLP

(57) ABSTRACT

A method for protected communication between a mobile unit coupled to a smartphone and a server, wherein it is possible to access a service of the server via the smartphone by registration data. Processes are provided for the first-time input of a PIN number in association with the registration data; definition of a secret of the mobile unit; storage of the registration data; the PIN number and the secret in a secure memory in the smartphone; input of the PIN number on the
(Continued)

mobile unit; transmission of the PIN number and the secret from the mobile unit to the secure memory; reading of at least a portion of the registration data from the secure memory if the transmitted PIN number and the transmitted secret match the stored PIN number and the stored secret; and transmission of at least the portion of the registration data from the smartphone to the server.

16 Claims, 1 Drawing Sheet

(51) Int. Cl.

| | | |
|---|---|---|
| *G06F 21/35* | (2013.01) | |
| *H04W 12/00* | (2009.01) | |
| *H04W 12/04* | (2009.01) | |
| *H04L 29/06* | (2006.01) | |
| *H04W 4/80* | (2018.01) | |
| *G06F 1/16* | (2006.01) | |

(52) U.S. Cl.
CPC ........ *H04L 63/0442* (2013.01); *H04L 63/083* (2013.01); *H04W 12/003* (2019.01); *H04W 12/04* (2013.01); *G06F 1/163* (2013.01); *H04W 4/80* (2018.02)

(58) Field of Classification Search
CPC ... H04L 63/0442; H04L 63/083; G06F 1/163; G06F 21/35
See application file for complete search history.

(56) References Cited

U.S. PATENT DOCUMENTS

| | | | | |
|---|---|---|---|---|
| 10,063,374 B2* | 8/2018 | Bamasag | ............... | H04L 9/3066 |
| 2003/0041244 A1* | 2/2003 | Buttyan | ................. | G06Q 20/20 |
| | | | | 713/172 |
| 2005/0039010 A1* | 2/2005 | Grove | ............... | H04W 12/0609 |
| | | | | 713/170 |
| 2005/0125669 A1* | 6/2005 | Stewart | ............... | H04L 63/0492 |
| | | | | 713/171 |
| 2009/0271621 A1* | 10/2009 | Mendelovich | ........ | H04W 12/02 |
| | | | | 713/168 |
| 2010/0228990 A1* | 9/2010 | Billings | ................... | G06F 21/78 |
| | | | | 713/185 |
| 2012/0311322 A1* | 12/2012 | Koyun | ................... | G06Q 20/3227 |
| | | | | 713/156 |
| 2013/0152179 A1* | 6/2013 | Lee | .......... | G06F 21/31 |
| | | | | 726/6 |
| 2013/0263234 A1* | 10/2013 | Givoni | ................... | H04L 63/18 |
| | | | | 726/5 |
| 2014/0040136 A1* | 2/2014 | Gatlin | .................... | G06Q 50/26 |
| | | | | 705/44 |
| 2014/0108486 A1 | 4/2014 | Borzycki et al. | | |
| 2014/0168071 A1 | 6/2014 | Ahmed et al. | | |
| 2014/0181954 A1* | 6/2014 | Robertson | ............... | G07C 9/257 |
| | | | | 726/17 |
| 2014/0230019 A1 | 8/2014 | Civelli et al. | | |
| 2014/0245396 A1* | 8/2014 | Oberheide | ........ | H04W 12/0608 |
| | | | | 726/4 |
| 2014/0331060 A1* | 11/2014 | Hayton | ................... | G06F 21/31 |
| | | | | 713/186 |
| 2014/0334271 A1 | 11/2014 | Park et al. | | |
| 2015/0089590 A1* | 3/2015 | Krishnan | ................ | H04L 63/08 |
| | | | | 726/3 |
| 2015/0147065 A1 | 5/2015 | Civelli et al. | | |
| 2015/0161371 A1* | 6/2015 | Hoshi | ..................... | G06F 21/35 |
| | | | | 726/19 |
| 2015/0178757 A1* | 6/2015 | Moshal | ................. | H04L 9/0819 |
| | | | | 705/14.26 |
| 2015/0186636 A1* | 7/2015 | Tharappel | ................. | H04L 63/104 |
| | | | | 726/8 |
| 2015/0199684 A1* | 7/2015 | Maus | ................. | G06Q 20/3829 |
| | | | | 705/71 |
| 2015/0222517 A1* | 8/2015 | McLaughlin | ....... | H04L 63/0435 |
| | | | | 713/156 |
| 2015/0295901 A1* | 10/2015 | Woodward | .......... | H04L 63/0492 |
| | | | | 713/168 |
| 2015/0332038 A1* | 11/2015 | Ramsden | ................ | G06F 21/32 |
| | | | | 726/19 |
| 2015/0373149 A1* | 12/2015 | Lyons | ............... | H04M 1/72533 |
| | | | | 709/203 |
| 2016/0005032 A1* | 1/2016 | Yau | ........................ | H04L 9/3226 |
| | | | | 705/69 |
| 2016/0065544 A1* | 3/2016 | Chen | ..................... | H04L 9/0863 |
| | | | | 713/168 |
| 2016/0085954 A1* | 3/2016 | Tunnell | ................... | G06F 21/32 |
| | | | | 726/7 |
| 2016/0142211 A1* | 5/2016 | Metke | ................... | H04L 9/3263 |
| | | | | 713/175 |
| 2016/0246454 A1* | 8/2016 | Vonshak | ............... | G06F 3/0482 |
| 2016/0353266 A1* | 12/2016 | Winkler | ............... | G08B 25/016 |
| 2017/0039599 A1* | 2/2017 | Tunnell | ............... | G06Q 30/0255 |
| 2017/0048212 A1* | 2/2017 | Everhart | ............... | H04L 63/061 |
| 2017/0126610 A1* | 5/2017 | Sachidanandam | ...... | H04L 51/26 |
| 2018/0176223 A1* | 6/2018 | Hutchinson | ........... | H04L 9/3226 |
| 2018/0203601 A1* | 7/2018 | Birchfield | ............. | H04L 63/105 |

FOREIGN PATENT DOCUMENTS

| | | |
|---|---|---|
| WO | 2014143916 A2 | 9/2014 |
| WO | 2015126095 A1 | 8/2015 |

OTHER PUBLICATIONS

Search Report for International Patent Application No. PCT/EP2016/079437; dated Mar. 7, 2017.

\* cited by examiner

METHOD AND SYSTEM FOR PROTECTED COMMUNICATION BETWEEN A MOBILE UNIT COUPLED TO A SMARTPHONE AND A SERVER

PRIORITY CLAIM

This patent application is a U.S. National Phase of International Patent Application No. PCT/EP2016/079437, filed 1 Dec. 2016, which claims priority to German Patent Application No. 10 2015 225 792.4, filed 17 Dec. 2015, the disclosures of which are incorporated herein by reference in their entireties.

SUMMARY

Illustrative embodiments relate to a method and a system for protected communication between a mobile unit coupled to a smartphone and a server, and a computer program product.

BRIEF DESCRIPTION OF THE DRAWINGS

Disclosed embodiments will be explained below using the appended drawings, in which.

DETAILED DESCRIPTION

Figure 1:
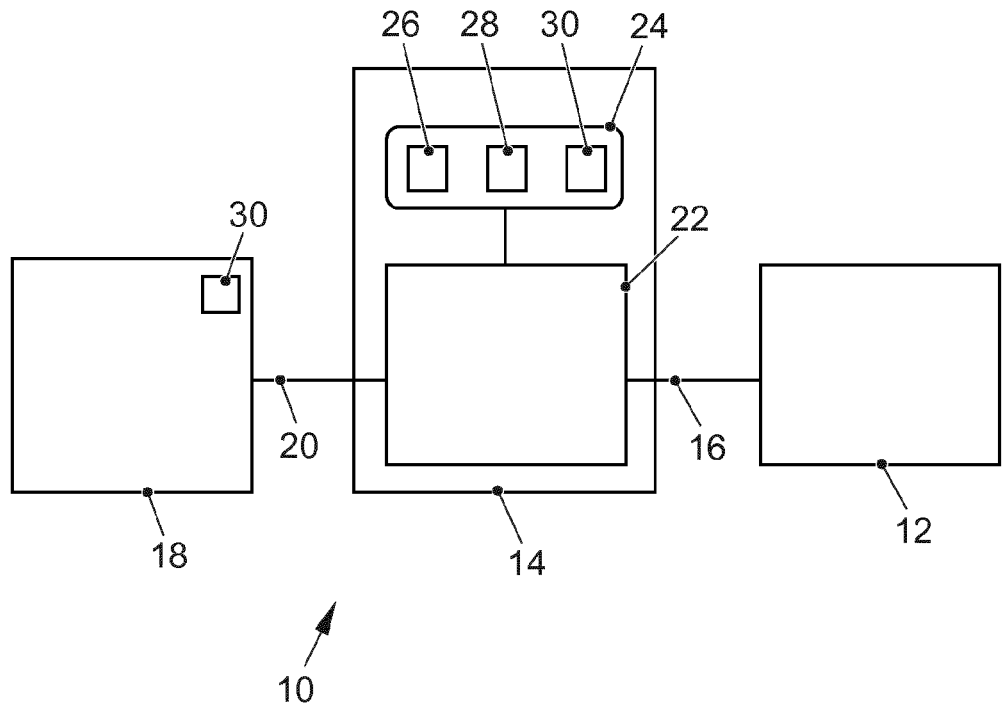
FIG. 1 shows a schematic illustration of a system for protected communication between a mobile unit coupled to a smartphone and a server.

Increasingly, the situation arises in which a mobile device such as a smartphone acts as a base or connection point for further mobile devices, for example, a smartwatch. Although operating concepts and security functions are also transferred from the smartphone to the smartwatch, the question arises as to whether, with regard to the differences in the interfaces and in the computing power, all the demands on security and operator friendliness on the smartwatch can be ensured.

US 2009/0271621 A1 discloses a method with facilitated login function for smartphones, in which firstly registration data and a PIN are transmitted to a server and the latter checks the registration data. If the check is successful, encrypted data comprising the registration data and the PIN is transmitted to the smartphone, which then, upon renewed login, transmits only the PIN and the encrypted data.

US 2014/168071 A1 discloses a method for rerouting personal data from a computer to another device in the vicinity of a user, the presence of the user being determined by presence detection on the basis of biometric features.

US 2014/181954 A1 discloses a method for transmitting a digital identity from a server to a mobile device such as a smartphone and/or a smartwatch. For example, the smartphone provides the smartwatch with the complete digital identity, so that the smartwatch can function like the smartphone.

Disclosed embodiments are based on safely configuring and simplifying the communication between a mobile unit coupled to a smartphone and a server.

This is achieved by a method, a system and a computer program product.

The disclosed method for protected communication between a mobile unit coupled to a smartphone and a server, wherein it is possible to access a service of the server via the smartphone by registration data, comprising:

first-time entry of a secret number in association with the registration data;
definition of a secret of the mobile unit;
storage of the registration data, the secret number and the secret in a secure memory in the smartphone;
entry of the secret number on the mobile unit;
transmission of the secret number and of the secret from the mobile unit to the secure memory;
reading of at least part of the registration data from the secure memory if the transmitted secret number and the transmitted secret match the stored secret number and the stored secret; and
transmission of at least part of the registration data from the smartphone to the server.

In the disclosed embodiments, simple operation with maximum security is permitted by the simplified entry of a secret number such as a PIN instead of a password on the mobile unit. Anywhere where a mobile unit, such as a smartwatch, for example, is used to use a secure account in which a password has to be entered, the method presented here in conjunction with a smartphone or a similar mobile device can simplify the usage. The security is completely preserved, since the storage of the registration data, the secret number and the secret is carried out exclusively in a secure memory in the smartphone. No storage of this data in the program, for example, an App, on the smartphone or on the mobile unit is carried out. The secret is used to identify the mobile unit uniquely so that, in conjunction with the secret number, secure registration on the smartphone or its secure memory can be carried out. The secure memory can, for example, be a password-protected keystore. The secure system overall, but at least the entry relating to the respective secret number, is secured by this secret number.

Provision can be made for the secure memory in the smartphone to be separated from a data and/or program storage location. This increases the security, since a secure memory permits and offers higher security measures than a program or software such as an App.

Provision can also be made for the registration data to comprise a username and a password, wherein the part of the registration data is the password. This type of registration data is widespread, so that extensive compatibility with existing systems is provided. Provision can be made for only the password from the registration data to be stored in the memory. The username is usually known, so that, by this measure, storage space in the secure memory can be saved. The username can then be stored in another memory or in the program.

The mobile unit can be a smartwatch or a wearable computer. Such units, such as, for example, including data spectacles or data contact lenses, are increasing in importance and permit multiply simplified user entries. However, the user interfaces of such mobile units are normally poorly suited for the entry of passwords, so that the solution proposed here, to replace a password by a simpler secret number such as a four-digit PIN, for example, is appropriate.

Provision can be made for the secret number to be entered on the smartphone for the first time. During the first-time entry, it may be more convenient and also more secure to enter the secret number directly into the smartphone, where it is stored. Alternatively, an entry and subsequent transmission by the mobile unit is possible.

The secret can comprise a network identifier. Since the mobile unit comprises at least one interface to a network for communication, the unique identifier such as a BLU- ETOOTH® ID or an MAC address (Media Access Control Address) can be used. This network identifier is already present and is the hardware address of each individual network adapter, to identify the latter uniquely in a network. Thus, unique identification of the mobile unit can be achieved with little outlay.

Provision can be made that, following the transmission of at least part of the registration data, a service between the server and the mobile unit is started. The method operations described can go beyond the communication for the access to or for the preparation of a service, and can comprise the start and also the operation of a service such as, for example, an online service. Services of this type are already available, for example, in transportation vehicles, such as door opening, transportation vehicle parking, etc., or in domestic appliances or smart home installations such as, for example, washing machines or refrigerators.

The disclosed system for protected communication between a mobile unit coupled to a smartphone and a server, access to a service of the server being possible via the smartphone by a user identifier, characterized in that the mobile unit comprises a secret, in that the smartphone and/or the mobile unit is configured for the first-time entry of a secret number in association with the user identifier, in that the smartphone has a secure memory configured to store the user identifier, the secret number and the secret, in that the mobile unit is configured for the transmission of the secret number, re-entered on the mobile unit, and of the secret from the mobile unit to the secure memory, in that the smartphone is configured to read at least part of the user identifier from the secure memory if the transmitted secret number and the transmitted secret match the stored secret number and the stored secret, and to transmit at least part of the user identifier from the smartphone to the server. The same benefits and modifications as previously described apply.

The mobile unit can be a smartwatch or a wearable computer. Such units, such as, for example, including data spectacles or data contact lenses, are increasing in importance and permit multiply simplified user entries. However, the user interfaces of such mobile units are normally poorly suited for the entry of passwords, so that the solution proposed here, to replace a password by a simpler secret number such as a four-digit PIN, for example, is appropriate.

Provision can be made for the mobile unit and the smartphone to communicate via a radio network. Such a connection is widely available and has adequate security standards, so that there is very good compatibility.

The connection between the mobile unit and the smartphone and/or between the smartphone and the server can be protected by cryptographic methods, such as by the use of symmetrical or asymmetrical keys. In this way, the security can be increased further.

The disclosed computer program product comprises program code to carry out the previously described method when the program product is executed on a device or a system for protected communication. The same benefits and modifications as previously described apply.

Further embodiments can be gathered from the remaining named features.

The various embodiments named in this application, if not otherwise explained in the individual case, can be combined with one another.

FIG. 1 shows a schematic illustration of a system 10 for protected communication with a server 12 and a smartphone 14. The server 12 or else a backend offer online services, for example, for transportation vehicles, domestic appliances or the like. The smartphone 12 can also be a portable computer such as a tablet or the like. The server 12 and the smartphone 14 communicate with each other via a communications link 16. The communications link 16 can be or have been built up via a radio network such as a mobile radio network. The communications link 16 can be protected with a cryptographic method.

A mobile unit, here a smartwatch 18, is coupled to the smartphone 14 and, via the smartphone 14, also coupled to the server 12. The mobile unit can also be a wearable computer or a wearable device, which means a portable device such as, for example, smart spectacles, or a computer unit arranged in an item of clothing.

The smartwatch 18 and the smartphone 14 communicate with each other via a communications link 20. The communications link 20 is typically short-range radio, such as, for example, BLUETOOTH®, near-field communication or the like. The transmission range lies in the range of centimeters to a few meters here. The communications link 20 can be protected with a cryptographic method.

To be able to use the service offered by the server 12, there is a program 22 on the smartphone 14. The program 22 can be an App, for example, which has been downloaded from the server 12 or another source and installed on the smartphone 14. The software or the program 22 can be an independent unit or consist of multiple elements, which can also be implemented in hardware.

In addition, the smartphone 14 contains a secure memory 24 which, for example, is secured with a password or key and in which registration data 26 for registration or access to a service of the server 12 is located. The registration data 26 comprises a username and an associated password.

Furthermore, a secret number 28 is stored in the secure memory 24. The secret number 28 such as a PIN (personal identification number), for example, having four digits, has been entered into the smartphone 14 or the smartwatch 18 in association with the registration data 26. The secret number 28 is used for the simplified entry of an access identifier on the smartwatch 18, which often has a rudimentary user interface. As will be described later in connection with FIG. 2, the entry of the secret number 28 replaces the entry of a normally more complex password of the registration data 26.

Furthermore, a secret 30 is stored in the secure memory 24. The secret 30 is a unique identifier of the smartwatch 18. This can be, for example, a network identifier such as a BLUETOOTH® ID or an MAC (Media Access Control) or else a pseudo-random number.

Figure 2:
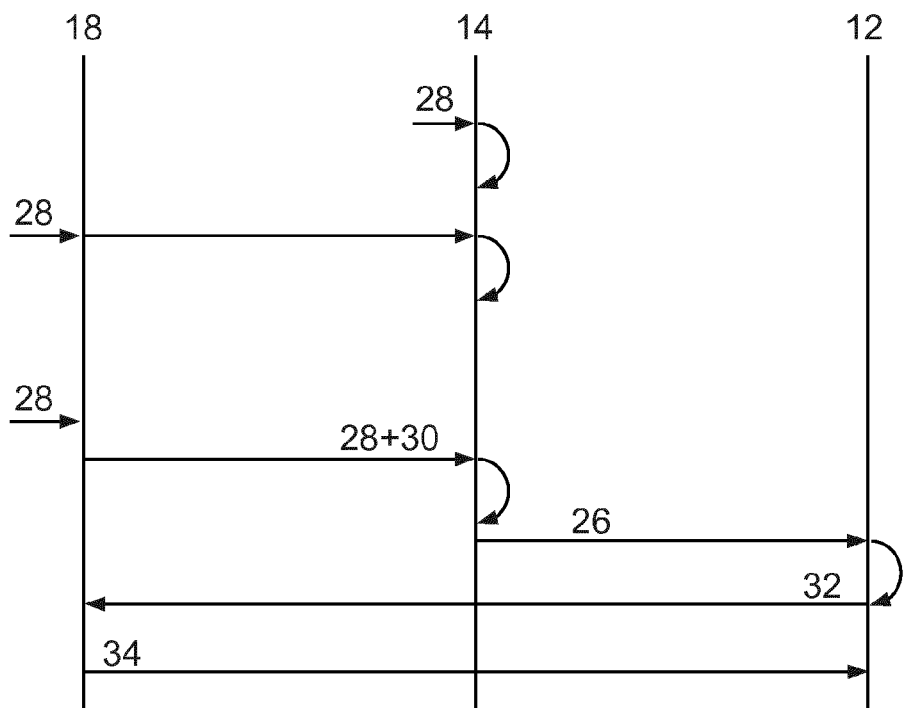
FIG. 2 shows a schematic illustration of a method for protected communication between a mobile unit coupled to a smartphone and a server.

By using FIG. 2, the method for protected communication between the smartwatch 18 coupled to the smartphone 14 and the server 12 will now be described.

Firstly, to a certain extent as preparation, the secret number 28 is entered into the smartphone 14 in association with the registration data 26 and, together with the registration data 26 and the secret 30, is stored in the secure memory 24. The secret number 28 can be entered into the smartphone 14 or into the smartwatch 18 and then transmitted to the smartphone 14 for the above-described storage.

If, then, a user wishes to use a service of the server 12, such as, for example, the opening of his transportation vehicle, with his smartwatch 18, he first enters the secret number 28 on the smartwatch 18. The secret number 28 is then transmitted to the smartwatch 14 together with the secret 30.

In the smartwatch 14, access to the secure memory 24 is made with the secret number 28 and the secret 30. If the check on the data is successful, which means the access authorization to the secure memory 26 by using the secret number 28 and the secret 30, the registration data 26 for the user of the smartphone 14 and therefore also the smartwatch 18 is read from the secure memory and transmitted to the server 12.

On the server 12, the registration data 26, which means username and password, is checked and, if the check is positive, the requested service 32 is started with a message or data transmission from the server 12 to the smartwatch 18. If provided in this service 32, the smartwatch 18 sends messages or data 34 back to the server. The communication between the server 12 and the smartwatch 18 can proceed via the smartphone 14. For instance, the server 12 and the smartphone 14 can communicate via a mobile radio protocol, and the smartphone 14 can then communicate with the smartwatch 18 via a BLUETOOTH® low energy link. Alternatively, the communication between the server 12 and the smartwatch 18 can be carried out directly, which means without incorporating the smartphone 14 in the execution of the service 32. In this case, it may be necessary for the smartphone 14 to transmit address information from the smartwatch 18 to the server 12.

Thus, by a simple entry of a secret number 28, such as a PIN, on the smartwatch 18, authentication can be carried out on the server 12. In addition, the method is very secure, since the secret number 28 remains only on the smartphone 14 when it has been entered there. All important data, such as the registration data 26, the secret number 28 and the secret 30, is stored only in the secure memory 24 of the smartphone 14 and not on the smartwatch 18 or in the program 22.

LIST OF DESIGNATIONS

10 System
12 Server
14 Smartphone
16 Communications link
18 Smartwatch
20 Communications link
22 Program
24 Secure memory
26 Registration data
28 Secret number
30 Secret
32 Service
34 Data

The invention claimed is:

1. A method for protected communication between a mobile unit coupled to a smartphone and a server, for access to a service of the server via the smartphone by registration data, the method comprising:
receiving first-time entry of a secret number in association with the registration data;
defining a secret of the mobile unit, wherein the secret comprises a network identifier of a network used by the mobile unit;
storing the registration data, the secret number, and the secret in a secure memory of the smartphone;
receiving a subsequent entry of another secret number on the mobile unit;
transmitting, from the mobile unit to the smartphone, the another secret number and the secret of the mobile unit;
reading, from the secure memory of the smartphone, at least part of the registration data in response to the transmitted another secret number and the transmitted secret matching the stored secret number and the stored secret; and
transmitting at least part of the registration data from the smartphone to the server.

2. The method of claim 1, wherein the secure memory in the smartphone is separated from a data and/or program storage location.

3. The method of claim 1, wherein the registration data comprise a username and a password, wherein the part of the registration data is the password.

4. The method of claim 1, wherein the mobile unit is a smartwatch or a wearable computer.

5. The method of claim 1, wherein the receiving of the first-time entry is on the smartphone.

6. The method of claim 1, wherein following the transmission of at least part of the registration data, a service between the server and the mobile unit is started.

7. A system for protected communication, the system comprising:
a mobile unit coupled to a smartphone and a server,
wherein the mobile unit comprises a secret, wherein the secret comprises a network identifier of a network used by the mobile unit,
wherein each of the smartphone and/or the mobile unit is configured to receive a first-time entry of a secret number in association with a user identifier,
wherein the smartphone has a secure memory to store the user identifier, the secret number, and the secret,
wherein the mobile unit is configured transmit another secret number entered on the mobile unit and the secret of the mobile unit to the smartphone, and
wherein the smartphone is configured to, in response to the transmitted secret number and the transmitted another secret matching the stored secret number and the stored secret, read, from the secure memory, at least part of the stored user identifier and to transmit at least part of the user identifier to the server.

8. The system of claim 7, wherein the mobile unit is a smartwatch or a wearable computer.

9. The system of claim 7, wherein the mobile unit and the smartphone communicate via a radio network.

10. The system of claim 7, wherein the connection between the mobile unit and the smartphone and/or between the smartphone and the server is protected by cryptographic methods.

11. A computer program product comprising program code for carrying out a method for protected communication between a mobile unit coupled to a smartphone and a server, for access to a service of the server via the smartphone when the program code is executed on a non-transitory device or system, the method comprising:
receiving a first-time entry of a registration data including a secret number;
defining a secret of the mobile unit, wherein the secret comprises a network identifier of a network used by the mobile unit;
storing the received registration data, the received secret number, and the defined secret in a non-transitory secure memory of the smartphone;
in response to receiving a subsequent entry of another secret number on the mobile unit, transmitting the another secret number and the secret from the mobile unit to the secure memory and comparing the another secret number to the stored secret number and the another secret to the stored secret;
in response to both the another secret number matching the stored secret number and the another secret matching the stored secret, reading at least part of the registration data from the secure memory; and transmitting at least part of the registration data from the smartphone to the server.

12. The computer program product of claim 11, wherein the secure memory in the smartphone is separate from a data and/or program storage location.

13. The computer program product of claim 11, wherein the registration data comprise a username and a password, and wherein the part of the registration data is the password.

14. The computer program product of claim 11, wherein the mobile unit is a smartwatch or a wearable computer.

15. The computer program product of claim 11, wherein the receiving of the first-time entry is on the smartphone.

16. The computer program product of claim 11, wherein following the transmission of at least part of the registration data, a service between the server and the mobile unit is started.

* * * * *